United States Patent
Ku

(10) Patent No.: US 9,688,251 B2
(45) Date of Patent: Jun. 27, 2017

(54) WIPER CONNECTOR AND BOLT-STABILIZING SLEEVE ADAPTOR

(75) Inventor: Yuan-Chin Ku, New Taipei (TW)

(73) Assignee: DONGGUAN HONGYI WIPER CO., LTD., Dong Guan, Guang Dong (CN)

( * ) Notice: Subject to any disclaimer, the term of this patent is extended or adjusted under 35 U.S.C. 154(b) by 287 days.

(21) Appl. No.: 13/620,774

(22) Filed: Sep. 15, 2012

(65) Prior Publication Data

US 2013/0185890 A1 Jul. 25, 2013

Related U.S. Application Data

(60) Provisional application No. 61/588,700, filed on Jan. 20, 2012.

(51) Int. Cl.
*B60S 1/40* (2006.01)
*B60S 1/38* (2006.01)

(52) U.S. Cl.
CPC ............ *B60S 1/407* (2013.01); *B60S 1/3849* (2013.01); *B60S 1/4077* (2013.01)

(58) Field of Classification Search
CPC .. B60S 1/38; B60S 1/40; B60S 1/3858; B60S 1/4064; B60S 1/4074; B60S 1/4077; B60S 2201/4093; Y10T 403/32877; Y10T 403/32893; Y10T 403/32901
USPC .......... 15/250.32, 250.361, 250, 351, 250.43
See application file for complete search history.

(56) References Cited

U.S. PATENT DOCUMENTS

| 1,394,740 | A | * | 10/1921 | Klocke | F16B 39/26 30/268 |
|---|---|---|---|---|---|
| 5,618,128 | A | * | 4/1997 | Chen | 403/344 |
| 2006/0021179 | A1 | | 2/2006 | Yang et al. | |
| 2007/0199174 | A1 | * | 8/2007 | Op't Roodt | B60S 1/4074 15/250.32 |
| 2009/0199357 | A1 | | 8/2009 | Thienard | |
| 2010/0050361 | A1 | * | 3/2010 | Chang | B60S 1/387 15/250.32 |

FOREIGN PATENT DOCUMENTS

| CN | 1310679 A | 8/2001 |
|---|---|---|
| CN | 1457308 A | 11/2003 |
| CN | 1946598 A | 4/2007 |
| DE | 10162397 A1 | 7/2003 |

(Continued)

*Primary Examiner* — Monica Carter
*Assistant Examiner* — Stephanie Berry
(74) *Attorney, Agent, or Firm* — Li & Cai Intellectual Property (USA) Office

(57) ABSTRACT

A wiper connector arranged to a bolt-type wiper arm, comprising a sleeve tube, a fastening member and a tube body, wherein the sleeve tube has a tube body, a first and a second flange, where the first flange defines a receiving compartment therein; the fastening member has a circular ring body and a plurality of abutting portions, the fastening member is fixed within the receiving compartment of the sleeve tube, the bolt is inserted into the fastening member, the circumferential portion of the bolt is tightly engaged by the plurality of abutting portions; the base has a clutching trough, a first and a second restricting trough, where the first and the second flanges of the sleeve tube are received respectively in the first and the second restricting troughs, and the tube body is secured in the clutching trough. The instant disclosure further provides a bolt-stabilizing sleeve adaptor.

13 Claims, 17 Drawing Sheets

(56) References Cited

FOREIGN PATENT DOCUMENTS

| | | |
|---|---|---|
| DE | 10163221 A1 | 7/2003 |
| DE | 102010030964 A1 | 1/2012 |
| WO | WO03/051688 A2 | 6/2003 |

\* cited by examiner

WIPER CONNECTOR AND BOLT-STABILIZING SLEEVE ADAPTOR

BACKGROUND OF THE INSTANT DISCLOSURE

1. Field of the Instant Disclosure

The instant disclosure relates to a wiper connector and a sleeve adaptor; in particular, to a wiper connector connectable to a bolt-type wiper arm and a sleeve adaptor.

2. Description of Related Art

In recent years, bolt-type wiper arms have been widely applied in modern cars. Typical bolt-type wiper arms usually have an engaging structure arranged proximate to the bolt for coupling the wiper connector. Nevertheless, the bolt-type wiper arms from different manufacturers across the industry do not share an universal standard for their engaging structure designs, and therefore, consumers have to consider if his/her current engaging structure is suitable before purchasing a new wiper blade. Thus, bringing disturbances to the consumers in selection of the products.

In order to be applicable on the various wiper products, high adaptability bolt-type wiper arms are being researched and invented. These bolt-type wiper arms usually have a stopping member arranged adjacent to the bolt, such that after the bolt is inserted into the wiper connector at a specific angle, the stopping member will prevent the wiper connector from detaching during operation. Although such type of bolt-type wipers are applicable on nearly all insertion-type wiper products. However, some cars have their own particularly designed bolt-type wiper arms that do not have the aforementioned high adaptability. Thus, the designers have to research new adaptable wiper connectors to meet the demands where this has turned out to be economically inefficient.

SUMMARY OF THE INSTANT DISCLOSURE

The object of the instant disclosure is to provide a wiper connector and a sleeve adaptor thereof for bolt-type wiper arms, where the sleeve adaptor is universally adaptable onto bolt-type wiper arms of different sizes and styles, thereby reducing the need for choosing and matching different types of bolts to the wiper assembly. Furthermore, the structural design and the assembling method of the instant disclosure is also simpler, and thereby, providing a more convenient utilization with a lower cost.

In order to achieve the aforementioned objects, according to an embodiment of the instant disclosure, a wiper connector arranged to a bolt-type wiper arm is provided, where the wiper connector includes a sleeve tube having a tube body, a first flange, and a second flange respectively extending from the two ends of the tube body. The sleeve tube has a pivoting hole defined therein, and one end of the pivoting hole forms an opening. The hollow interior of the first flange defines a receiving compartment; a fastening member in the form of a push-on clip having a circular ring body and a plurality of inwardly protruding abutting portions extending from the inner fringe of the circular ring body, the fastening member is fixed within the receiving compartment of the sleeve tube. The bolt of the wiper arm may be inserted into the fastening member and the pivoting hole, where the circumferential portion of the bolt is tightly engaged by the plurality of abutting portions; and a base having a clutching trough, a first restricting trough and a second restricting trough connected to the two ends of the clutching trough, the first and the second flanges of the sleeve tube are received respectively in the first and the second restricting troughs, and the tube body is received in the clutching trough, the tube body is engaged tightly within the clutching trough.

The instant disclosure further provides a sleeve adaptor arranged to a bolt-type wiper arm, comprising a sleeve tube having a tube body, a first flange and a second flange connected to the two ends of the tube body, wherein the sleeve tube has a pivoting hole defined therein and one end of the pivoting hole forms an opening, the first flange defines a receiving compartment therein; and a fastening member having a circular ring body and a plurality of abutting portions protrudingly formed on the inner fringe of the circular ring body, the fastening member is fixed within the receiving compartment of the sleeve tube, the bolt is inserted into the fastening member and the pivoting hole, the circumferential portion of the bolt is tightly engaged by the plurality of abutting portions.

The instant disclosure has the following advantages:

The fastening member of the instant disclosure is fixed within the receiving compartment of the sleeve tube, and the bolt of the wiper arm is inserted into the fastening member, the circumferential portion of the bolt is tightly engaged by the plurality of abutting portions to achieve a tight assembly. The wiper connector and the sleeve adaptor of the instant disclosure cannot be easily dismantled after they are assembled together, and thereby forming a firm, sleeve adaptor which cannot be easily dismantled unless by force. Therefore, the bolt can be well protected and the functional stability of the wiper during operation can be well maintained.

The wiper arm assembled to the sleeve tube can be assembled to the base directly from the top, where this assembly method is different from the methods of the prior art. Furthermore, the structural design and the assembling method of the sleeve tube, the fastening member and the base of the instant disclosure is also simpler, and thereby, providing a more convenient utilization with a lower cost.

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF THE PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

The First Embodiment

Figure 1:
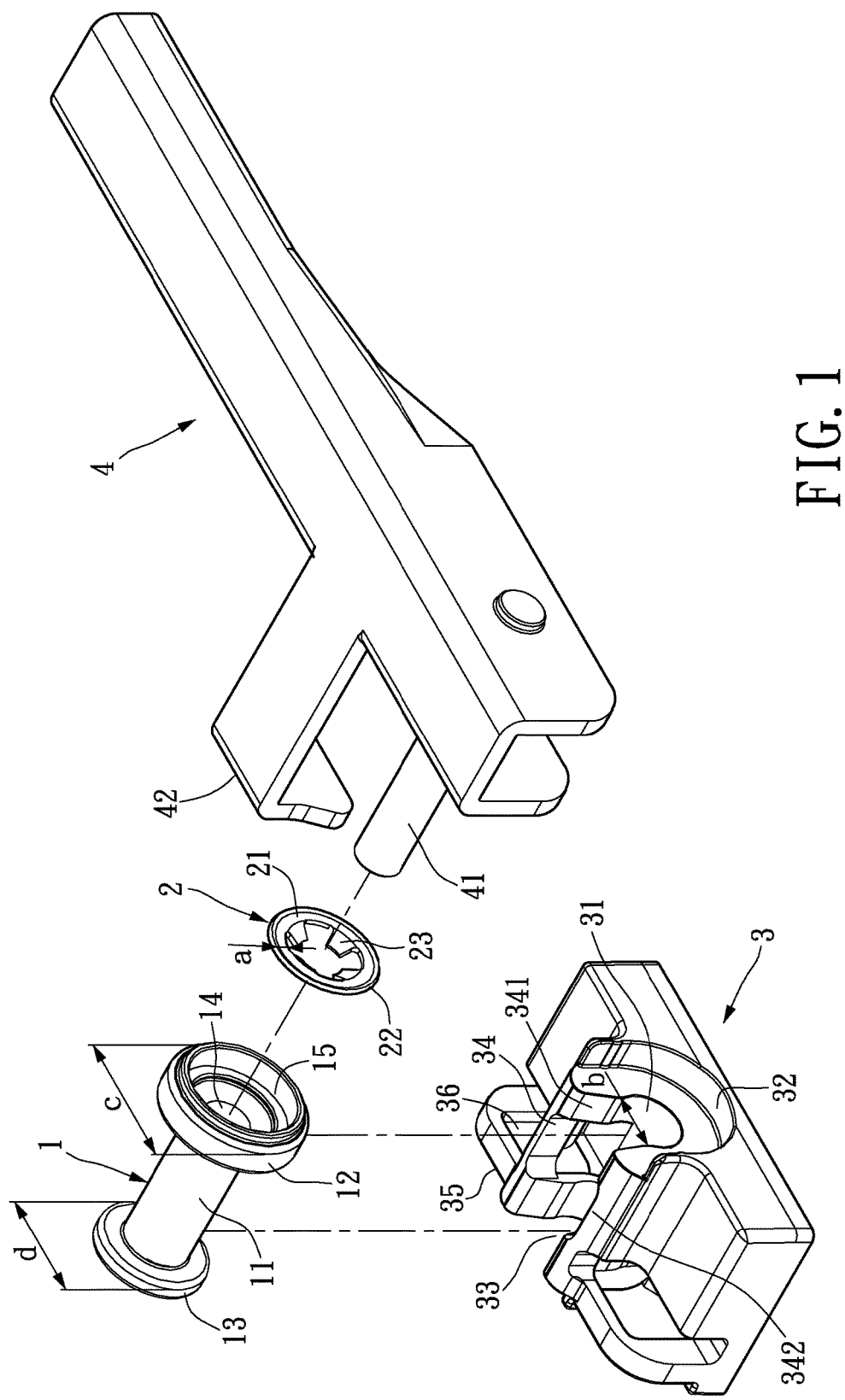
FIG. 1 shows a three-dimensional exploded view of a wiper connector according to a first embodiment of the instant disclosure.
Figure 2:
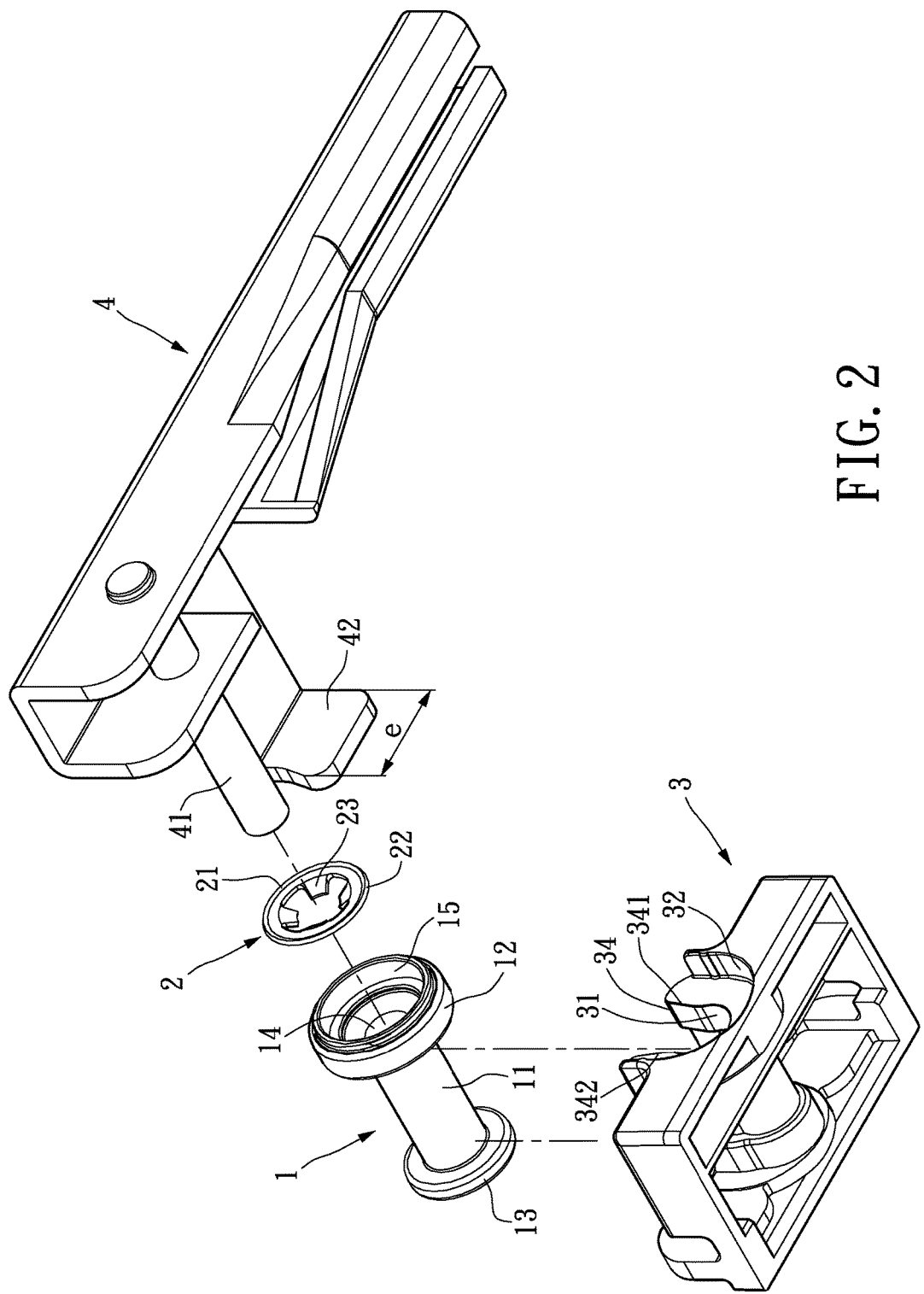
FIG. 2 shows a three-dimensional exploded view of the wiper connector from another angle according to the first embodiment of the instant disclosure.

Please refer to FIGS. 1 and 2, the instant disclosure provides a sleeve adaptor including a sleeve tube 1 and a fastening member 2. Preferably, the sleeve tube 1 is a cylindrical structure made of plastic; however the sleeve tube 1 can also be in the form of a polygonal prism/column in other embodiments. The sleeve tube 1 has a tube body 11 with a first flange 12 and a second flange 13 respectively extending from the two ends thereof. The outer diameters of the first flange 12 and the second flange 13 are greater than that of the tube body 11 to provide a blocking/positioning effect. The first flange 12 and the second flange 13 can have different outer diameters. It should be noted that, the shape and the outer diameter of the tube body 11, the first flange 12 and the second flange 13 are not restricted thereto and can be adjusted according to practical needs.

Figure 7:
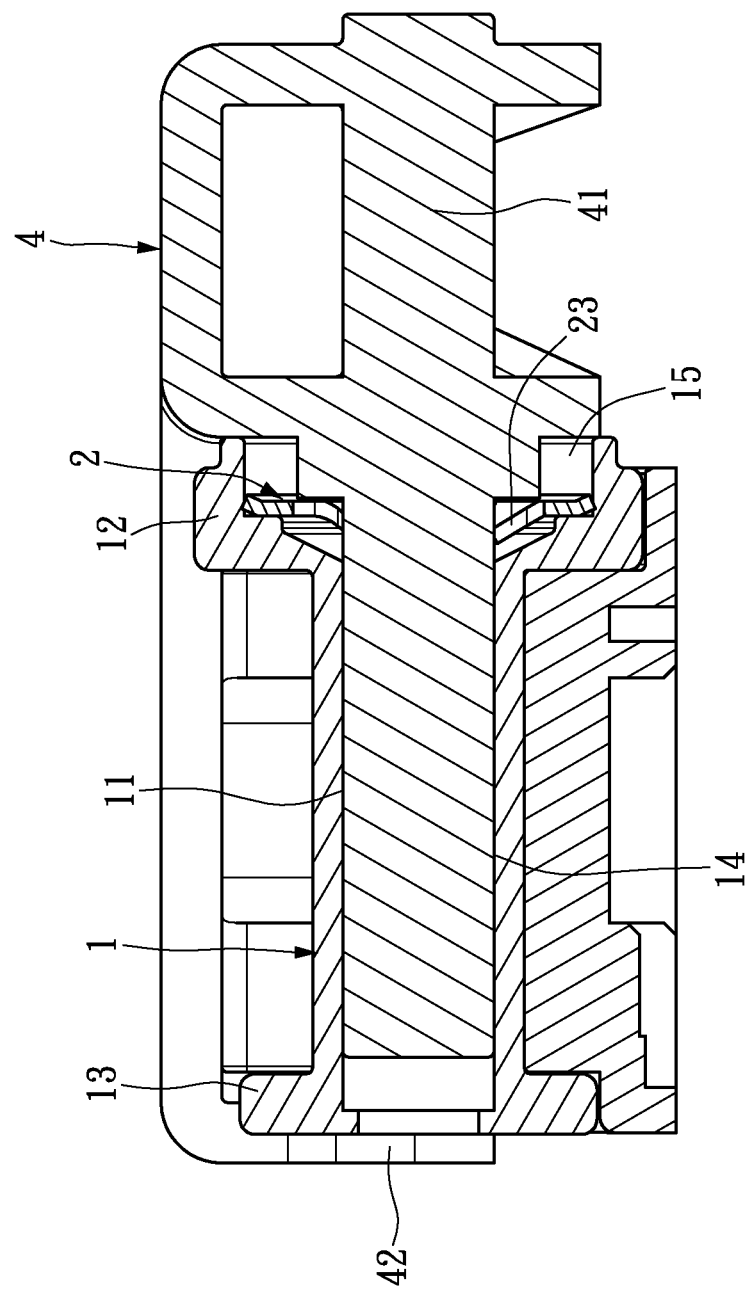
FIG. 7 shows a planar cross-sectional view of the wiper connector according to the first embodiment of the instant disclosure.

The sleeve tube 1 has a pivoting hole 14 defined therein, where the pivoting hole 14 can be a circular hole which is accommodatable for a bolt 41 of a wiper arm 4. The pivoting hole 14 extends along the axial direction of the sleeve tube 1, and one end of the pivoting hole 14, referring to the end adjacent to the wiper arm 4, forms an opening to receive the insertion of the bolt 41 of a wiper arm 4. The hollow interior inside the first flange 12 defines a receiving compartment 15. The shape of the receiving compartment 15 corresponds to that of the fastening member 2 in order to receive the fastening member 2. To provide further explanations, the other end of the pivoting hole 14, referring to the end away from the wiper arm 4, can be either closed or opened to the exterior, where the inner diameter thereof can be smaller than the diameter of the bolt 41, shown in FIG. 7, to prevent mis-mating of the bolt 41 into the pivoting hole 14 from this end.

Preferably, the fastening member 2 is in the form of a push-on clip made of metal. For the instant embodiment, the fastening member 2 has a circular ring body 21, an interfering portion 22 (outer rim), and a plurality of inwardly extending abutting portion 23. The circular ring body 21 is preferred to be a ring-shaped structure having an inner diameter that corresponds to the bolt 41, where the cross-sectional shape thereof can also be a polygon and is not restricted thereto. The interfering portion 22 is formed circumferentially around the circular ring body 21, where the shape and the amount thereof are not restricted thereto. For the instant embodiment, the interfering portion 22 is substantially a ring-shaped structure. The plurality of abutting portions 23 is formed in the inner fringe of the circular ring body 21 and protrudes therefrom, where the shape and the amount of the abutting portion 23 are not restricted thereto. For the instant embodiment, the abutting portion 23 is substantially a trapezoid-shaped structure, where the abutting portion 23 extends along the same direction with the inserting direction of the bolt 41. Specifically speaking, the extension of the abutting portion 23 is in the same direction with the inserting direction of the bolt 41 to enable smooth insertion, however difficult extraction, of the bolt 41.

Figure 3:
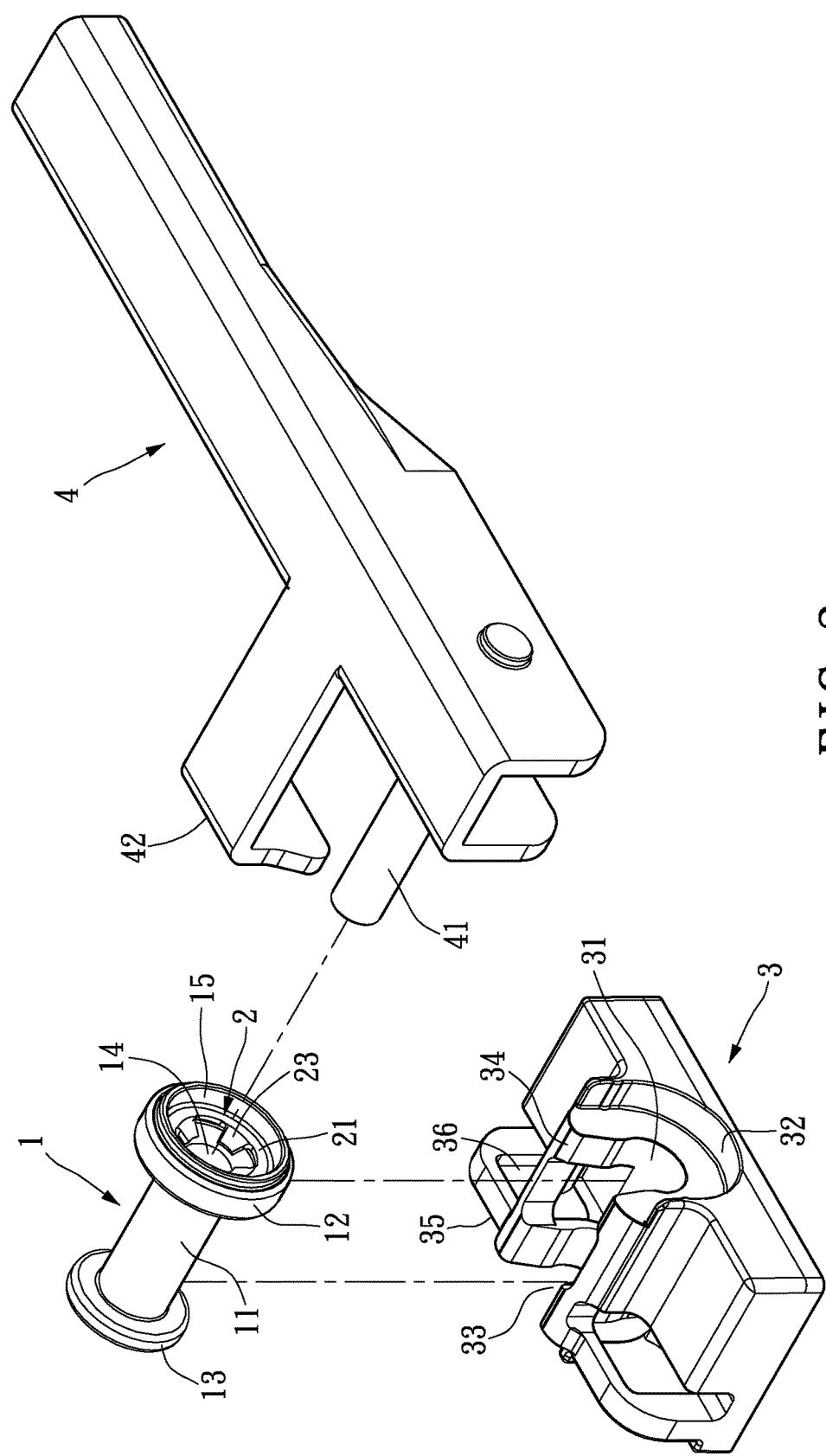
FIG. 3 shows a perspective view of an assembly of a sleeve tube and a fastening member according to FIG. 1.
Figure 4:
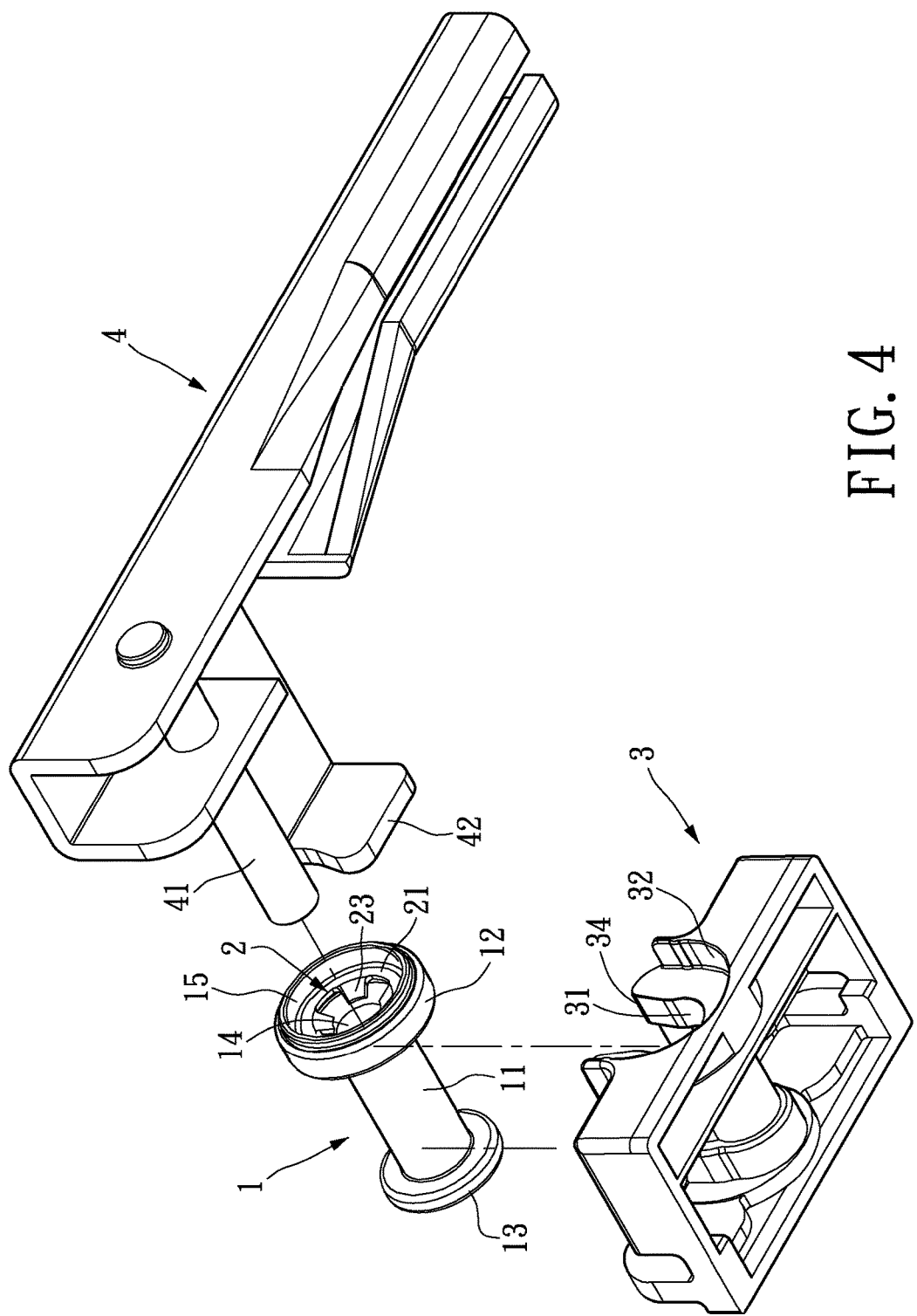
FIG. 4 shows a perspective view of an assembly of the sleeve tube and a fastening member according to FIG. 2.
Figure 5:
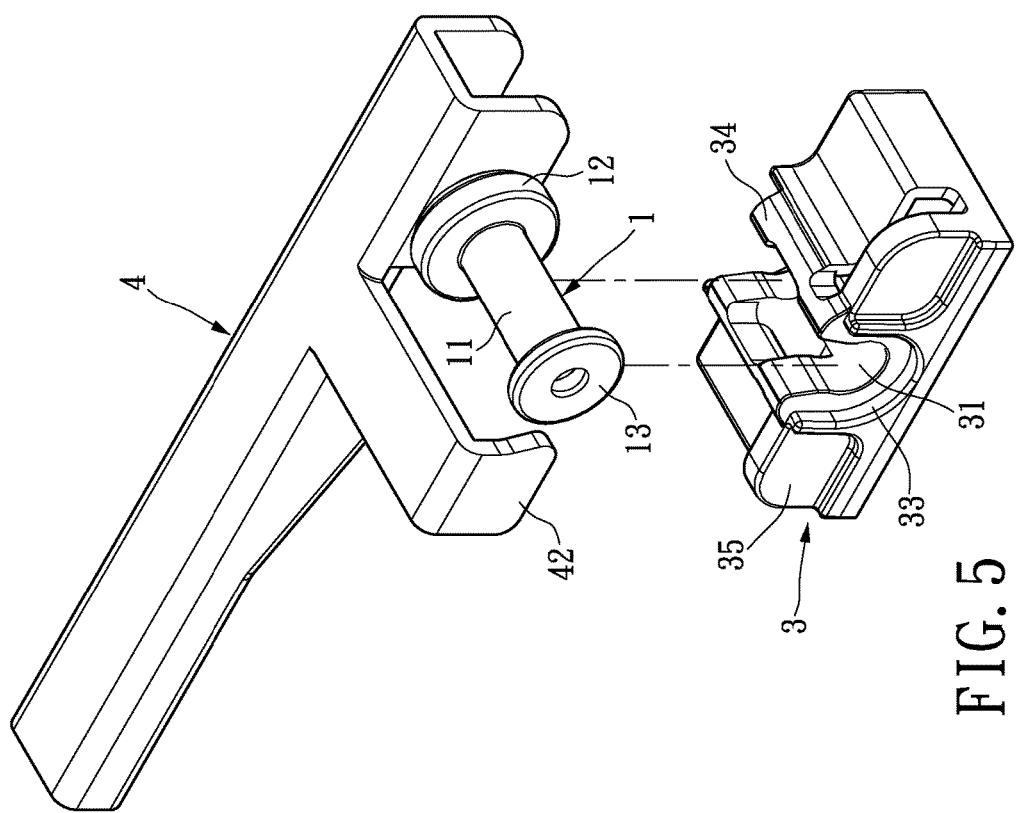
FIG. 5 shows a perspective view of an assembly of a sleeve adaptor and a wiper arm shown in FIG. 1.
Figure 6:
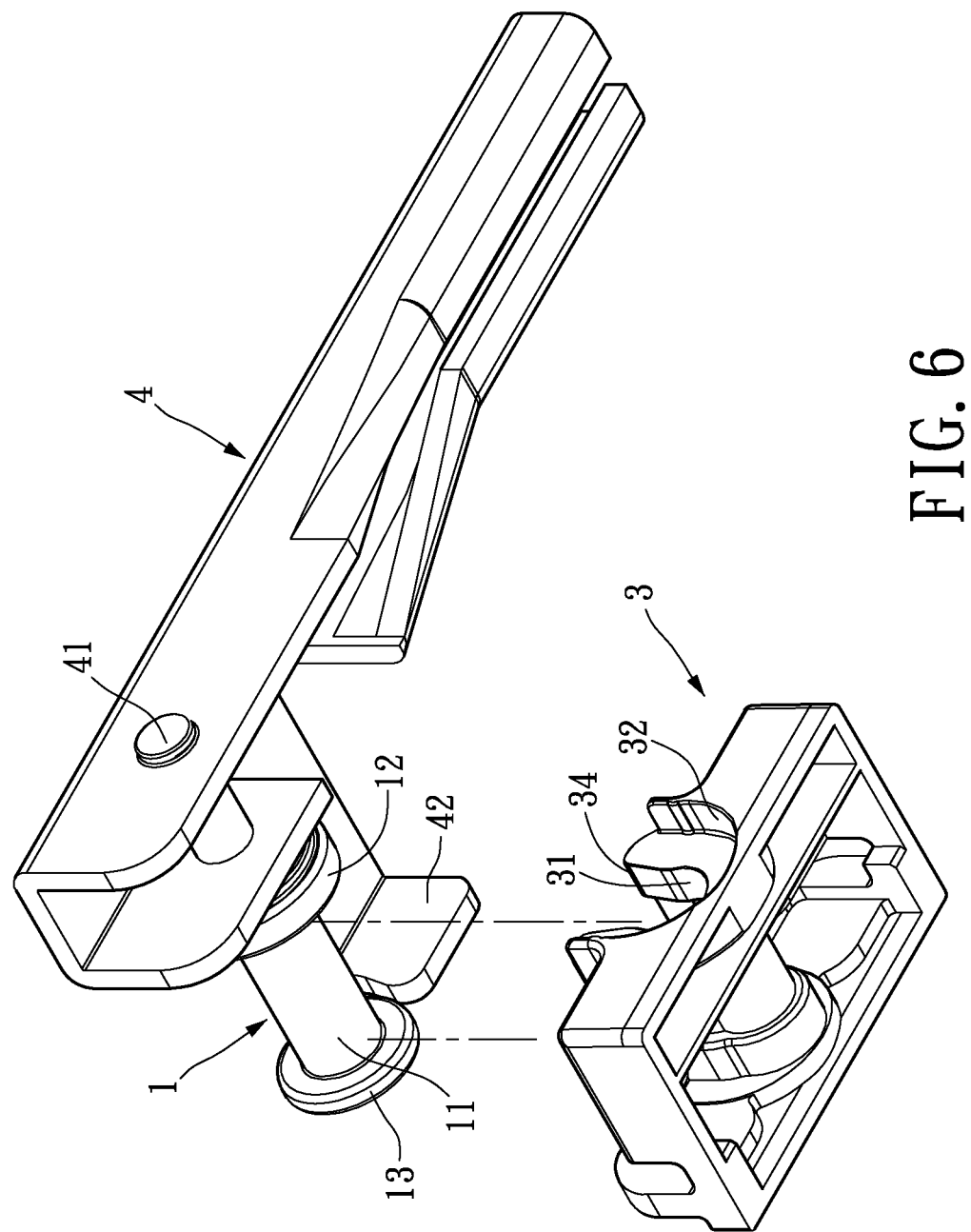
FIG. 6 shows a perspective view of an assembly of the sleeve adaptor and the wiper arm shown in FIG. 2.

The fastening member 2 is received in the receiving compartment 15 of the sleeve tube 1, and is fixed within the receiving compartment 15 through frictional contact of the interfering portion 22 to the inner walls of the receiving compartment 15 (shown in FIGS. 3 and 4). The fastening member 2 can also be fixed within the receiving compartment 15 of the sleeve tube 1 by mean of insert molding and other means to form a sleeve adaptor therewith. To provide further explanation, the distance "a" (shown in FIG. 1), referring to the distance between the inner and outer diameters of the fastening member 2, preferably smaller than 5 mm, even better, smaller than 3 mm to provide an ideal fixing effect, but this is not restricted thereto. However, if the distance "a" is greater than 5 mm, the strength of the fastening member 2 may be weakened such that the fixing effect thereof may also be weakened.

An embodiment of the invention can increase or decrease the distance "a" under the condition that the abutting portion 23 on the inner fringe of the fastening member 2 can abut tightly against the outer fringe of the bolt 41. To provide further explanations, the shortest distance formed between the tips of the abutting portion 23 is shorter than the diameter of the bolt 41. In other words, the diameter of the circle formed by joining the tips of the abutting portion 23 is shorter than the diameter of the bolt 41. Also, the size of the sleeve tube 1 and the fastening member 2 is not restricted thereto and can also be adjusted according to practical needs.

Please refer to FIGS. 3-7. The sleeve tube 1 and the fastening member 2 are assembled together before pushing the assembly of the sleeve tube 1 and the fastening member 2 directly into the bolt 41 for the bolt 41 to be inserted into the fastening member 2 and the pivoting hole 14. The circumferential portion of the bolt 41 will engage tightly against the inner fringe of the fastening member 2 to achieve a stabilized assembly. The sleeve adaptor cannot be easily dismantled from the wiper arm 4 after assemble thereto. Thus, forming a firm structure which cannot be easily dismantled unless by force to achieve the protecting effect of the bolt 41. There may be adjustments on the dimension of the bolt by the manufactures and thereby, the dimension of the sleeve tube 1 and the fastening member 2 is not restricted thereto and can be adjusted due to practical needs to be applicable on bolts of different dimensions.

The instant disclosure further provides a base 3. By assembling the base 3 to the sleeve tube 1 and the fastening member 2, a wiper connector can be formed to connect the wiper arm 4 and the wiper blade, where the structure and the type of the base 3 is not restricted thereto. For the instant embodiment, preferably, the base 3 is made of plastic and is integrally formed as a single unit, however, the base 3 can be also made of detachable components. The base 3 has a clutching trough 31, a first restricting trough 32 and a second restricting trough 33 connected at the two ends of the clutching trough 31, where the structural design of the clutching trough 31, the first restricting trough 32 and the second restricting trough 33 is not restricted thereto.

The clutching trough 31, the first restricting trough 32 and the second restricting trough 33 are in correspondence respectively to the tube body 11, the first restricting trough 32 and the second restricting trough 33 are arched troughs having openings on the top portions thereof. The opening on the top portion of the clutching trough 31 has a width smaller than the outer diameter of the tube body 11 to clutch and fix the sleeve tube 1.

The base 3 can further have an anti-mismating trough 34 formed thereon and at least one accommodating slot. For the instant embodiment, there are two accommodating slots, namely, a first accommodating slot 35 and a second accommodating slot 36. The first accommodating slot 35 and the second accommodating slot 36 may be arranged in such a way to accommodate the shoulder portion 42 of the wiper arm 4, thus avoiding structural interference between the wiper arm 4 and the base 3. For instance, the first accommodating slot 35 can receive the shoulder portion 42 of the wiper arm 4 to prevent interference between the base 3 and the shoulder portion 42.

The structural design of the anti-mismating trough 34 is not restricted thereto. For the instant embodiment, the anti-mismating trough 34 includes a protrusion 341 and a protrusion 342 protrudingly formed on the base 3, where the protrusion 341 and the protrusion 342 are formed on the two sides of the clutching trough 31. The distance "b" formed between the protrusion 341 and the protrusion 342 of the anti-mismating trough 34 is smaller than the outer diameter "c" of the first flange 12, the outer diameter "d" of the second flange 13, and the width "e" (shown in FIGS. 1 and 2) of the shoulder portion 42 of the wiper arm 4 to provide the anti-mismating effect. Thus, the sleeve tube 1 can only be assembled to the base 3 from the top but not in any other direction to ensure that the sleeve adaptor, the base 3 and the wiper arm 4 are assembled in the correct direction.

The distance "f" (shown in FIG. 9A) from any edge of the anti-mismating trough 34 to the center point of the sleeve tube 1 is greater than or equal to the distance "g" from the center point of the bolt 41 to the shoulder portion 42. Thus, if the sleeve tube 1 and the base 3 are assembled together before the bolt 41 of the wiper arm 4 is assembled to the sleeve tube 1 and the base 3, the bolt 41 will be unable to insert thereinto as the distance "f" is greater than or equal to the distance "g". Therefore, the shoulder portion 42 of the wiper arm 4 will abut against the anti-mismating trough 34 to occur interference therebetween during insertion regardless from any inserting angle. Thus, an anti-misating effect can be provided since the bolt 41 will not be able to insert into the sleeve tube 1 and the fastening member 2.

The width "j" of the anti-mismating trough 34 is greater than or equal to the distance i formed between the inner fringe of the shoulder portion 42 to the edge of the bolt 41. Thus, if the sleeve tube 1 and the base 3 are assembled together before the bolt 41 of the wiper arm 4 is assembled to the sleeve tube 1 and the base 3, the bolt 41 will be unable to insert thereinto as the width "j" is greater than or equal to the distance "i". Therefore, the anti-mismating trough 34 will interfere with the bolt 41 and the shoulder portion 42 to prevent the bolt 41 from inserting into the sleeve tube 1 and the fastening member 2, and thereby providing the anti-mismating effect.

Figure 8:
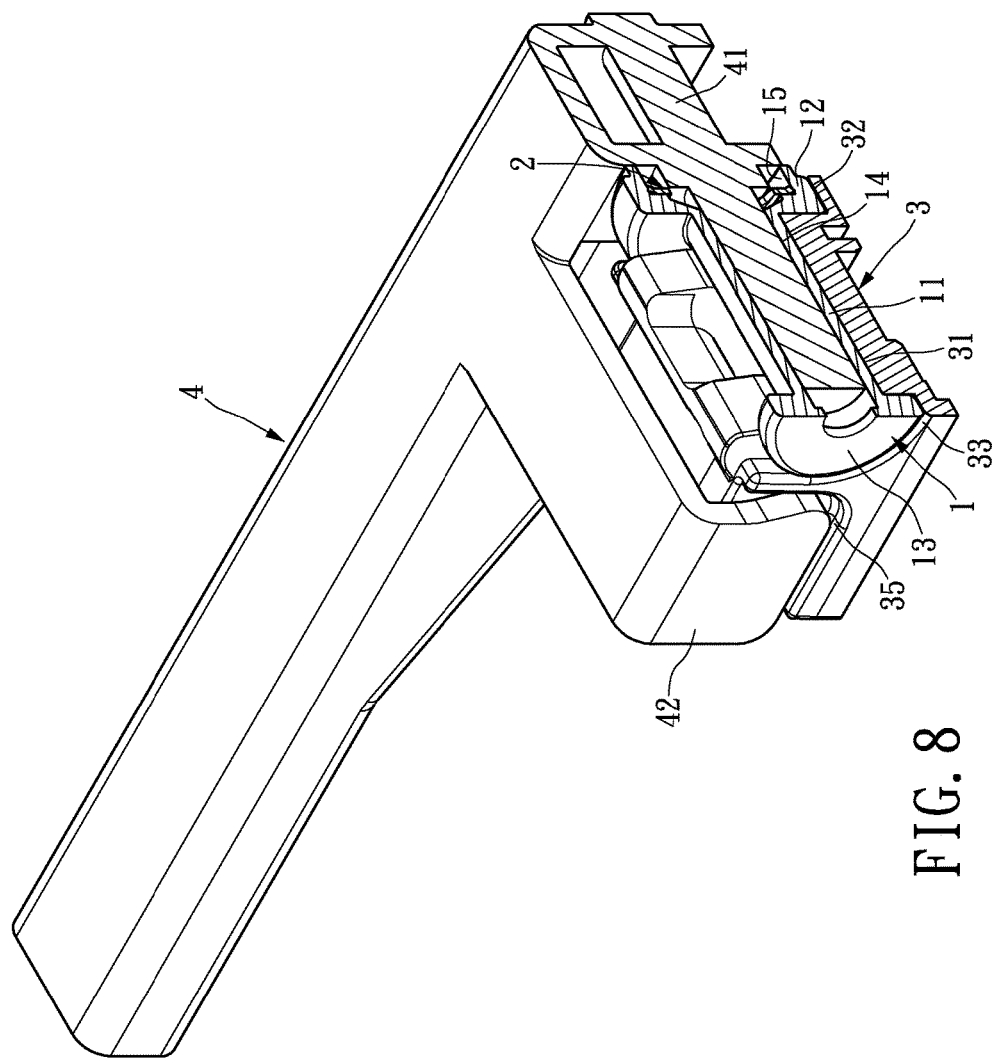
FIG. 8 shows a three-dimensional cross-sectional view of the wiper connector according to the first embodiment of the instant disclosure.
Figure 9:
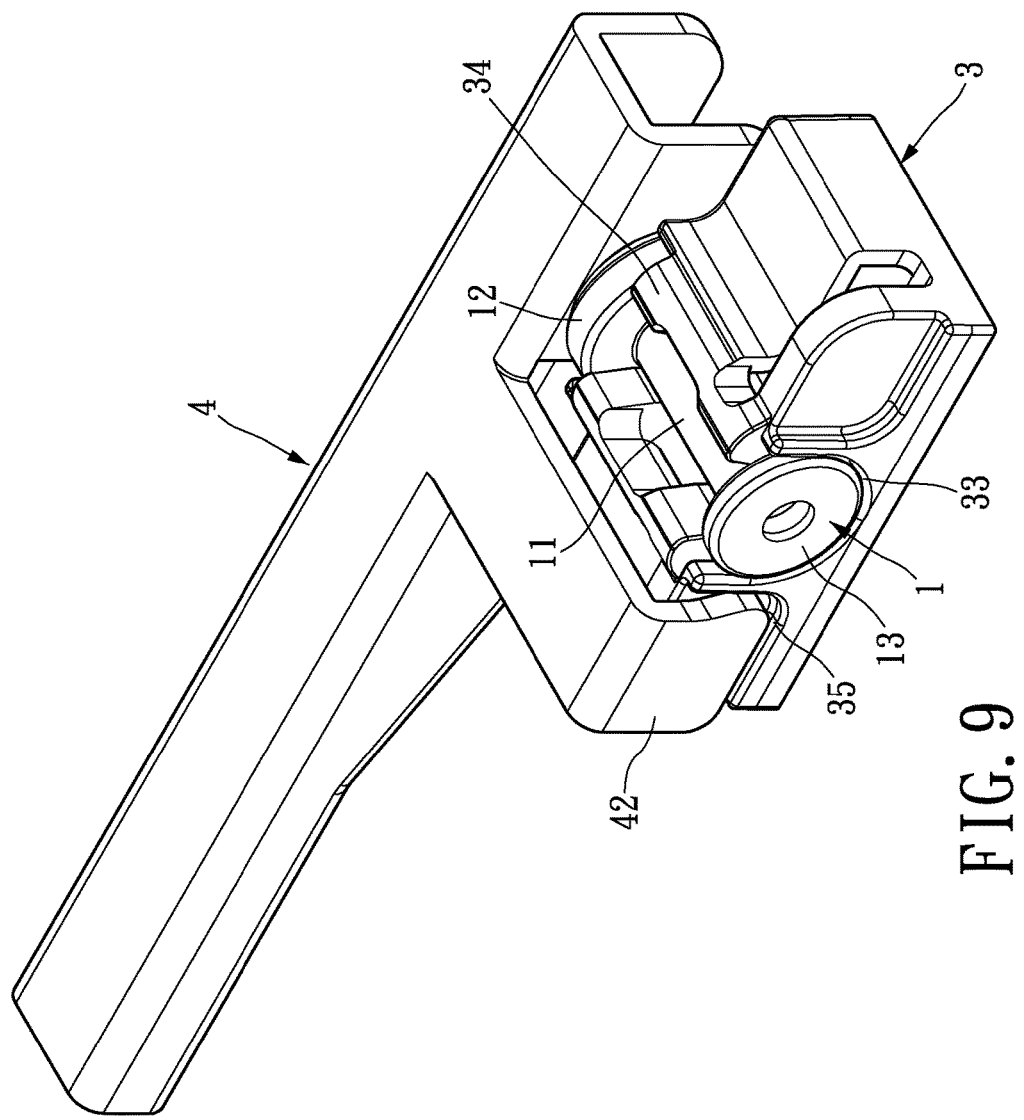
FIG. 9 shows a three-dimensional assembled view of the wiper connector according to the first embodiment of the instant disclosure.
Figure 9A:
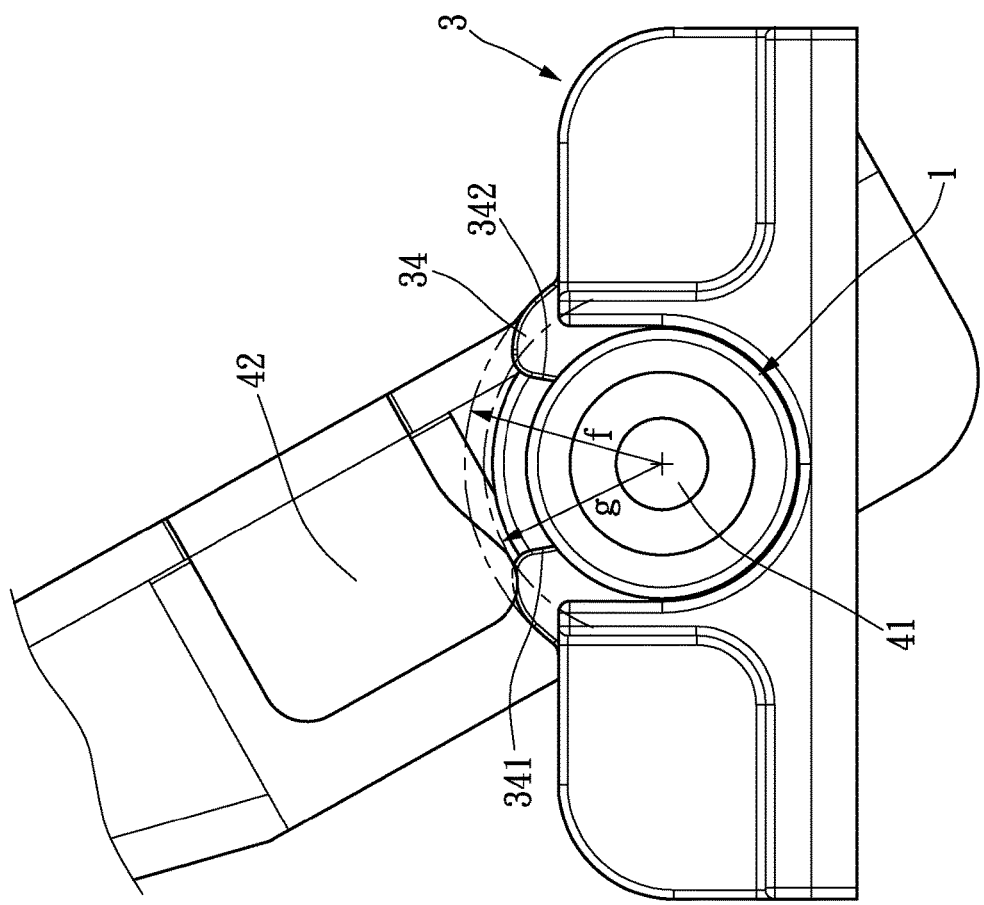
FIG. 9A shows a planar view of the wiper connector according to the first embodiment of the instant disclosure.
Figure 9B:
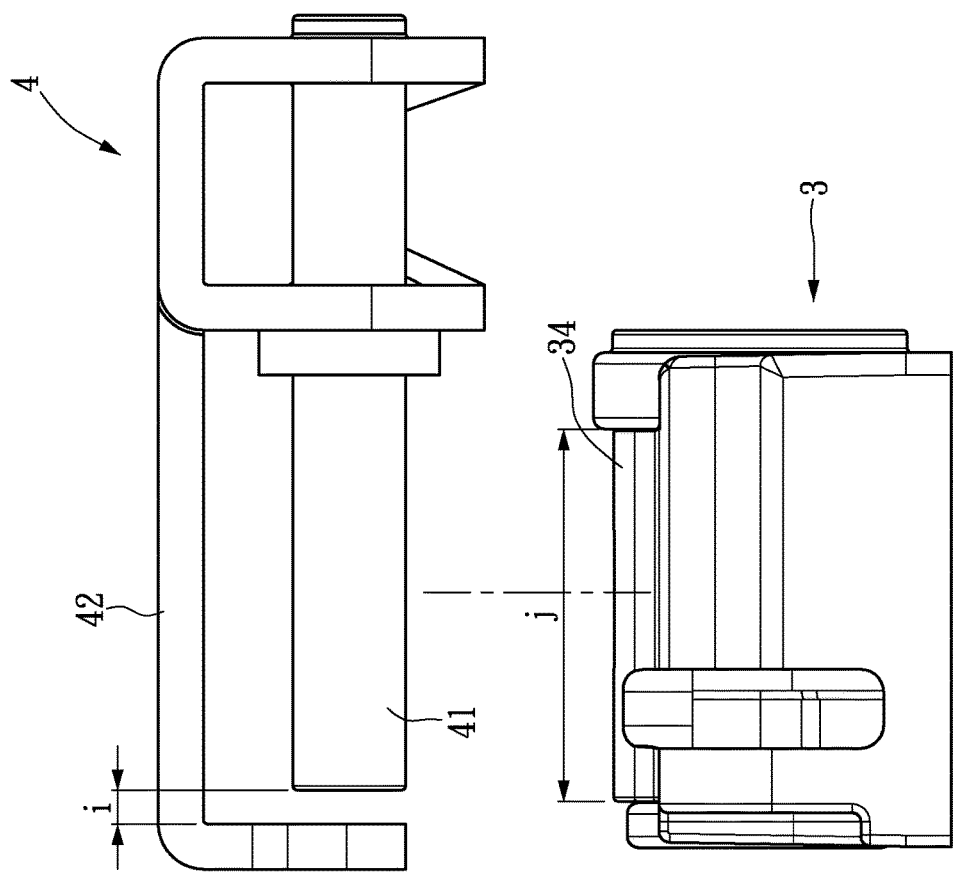
FIG. 9B shows a planar view of the wiper arm and the base of the instant disclosure.
Figure 10:
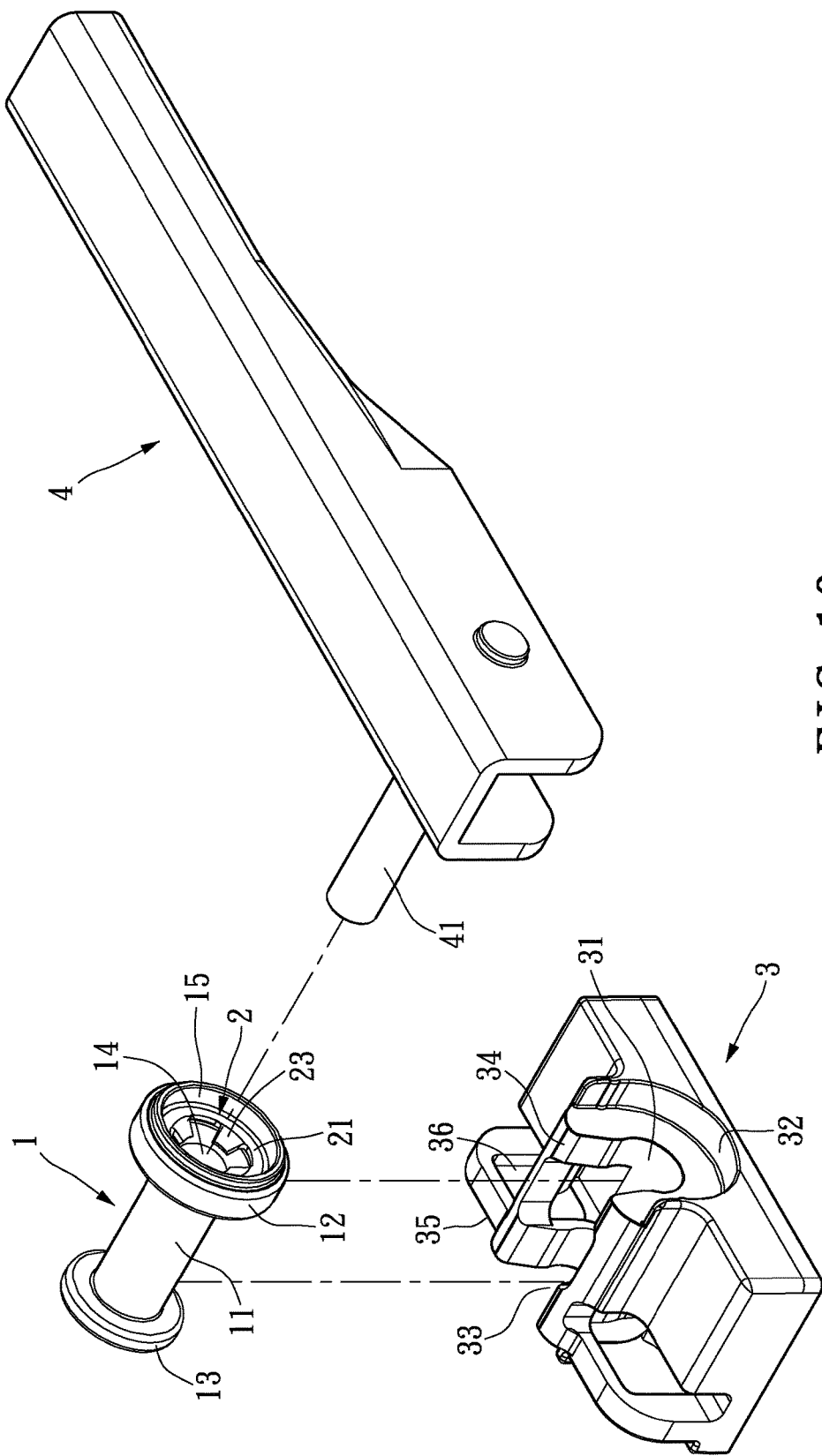
FIG. 10 shows a three-dimensional view of the wiper connector according to the second embodiment of the instant disclosure.
Figure 11:
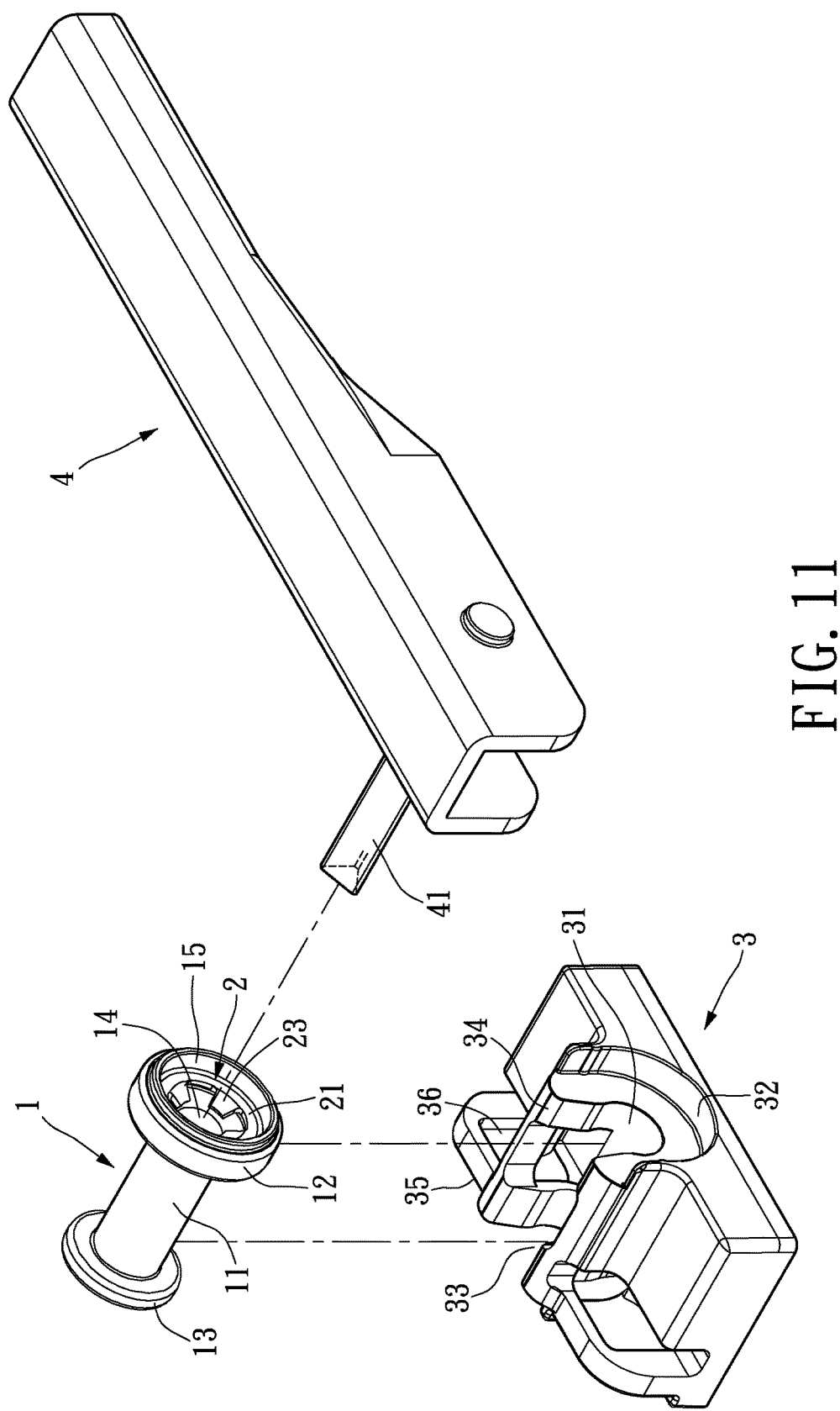
FIG. 11 shows a three-dimensional view of the wiper connector according to the third embodiment of the instant disclosure.
Figure 12:
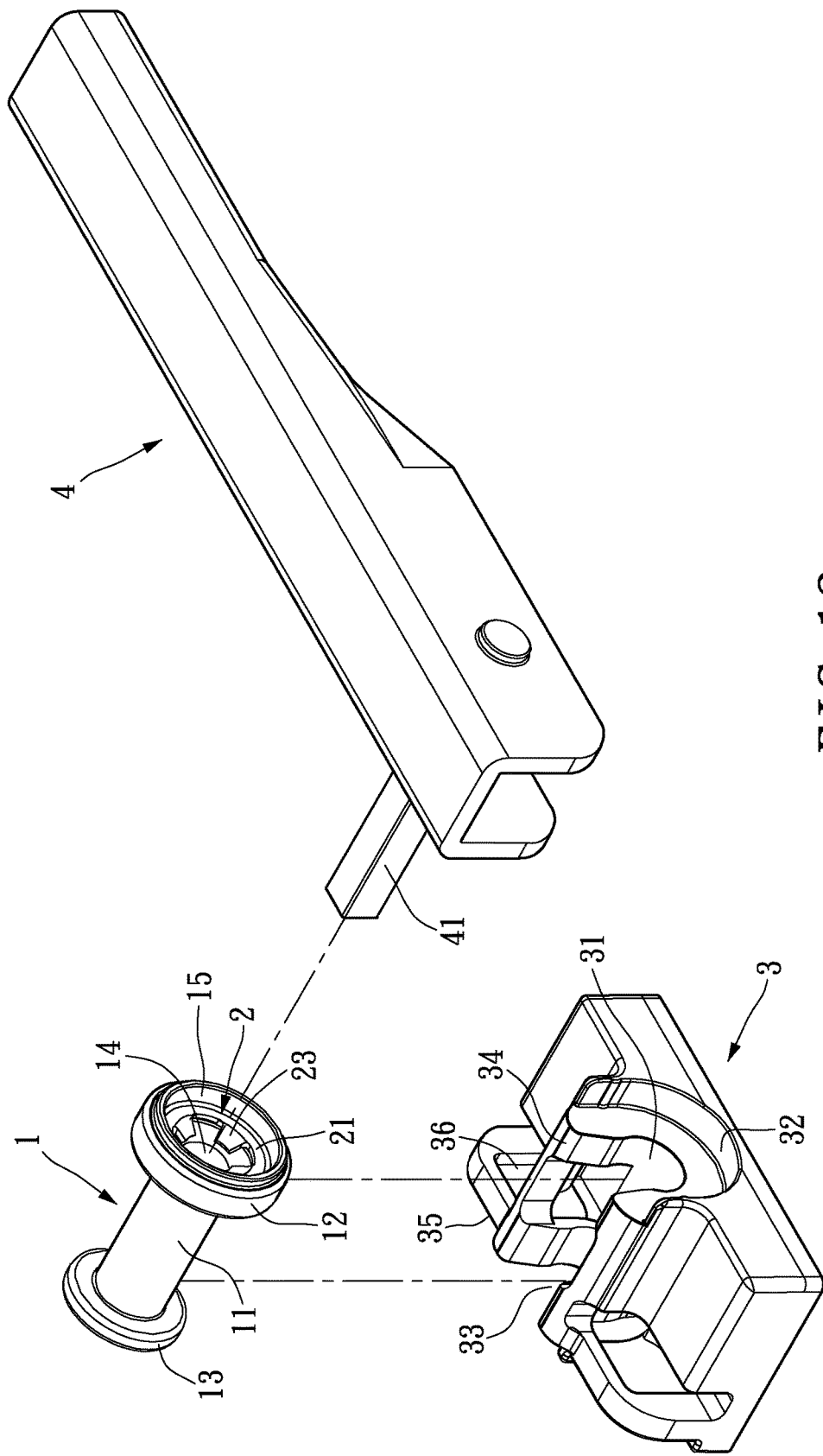
FIG. 12 shows a three-dimensional view of the wiper connector according to the fourth embodiment of the instant disclosure.
Figure 13:
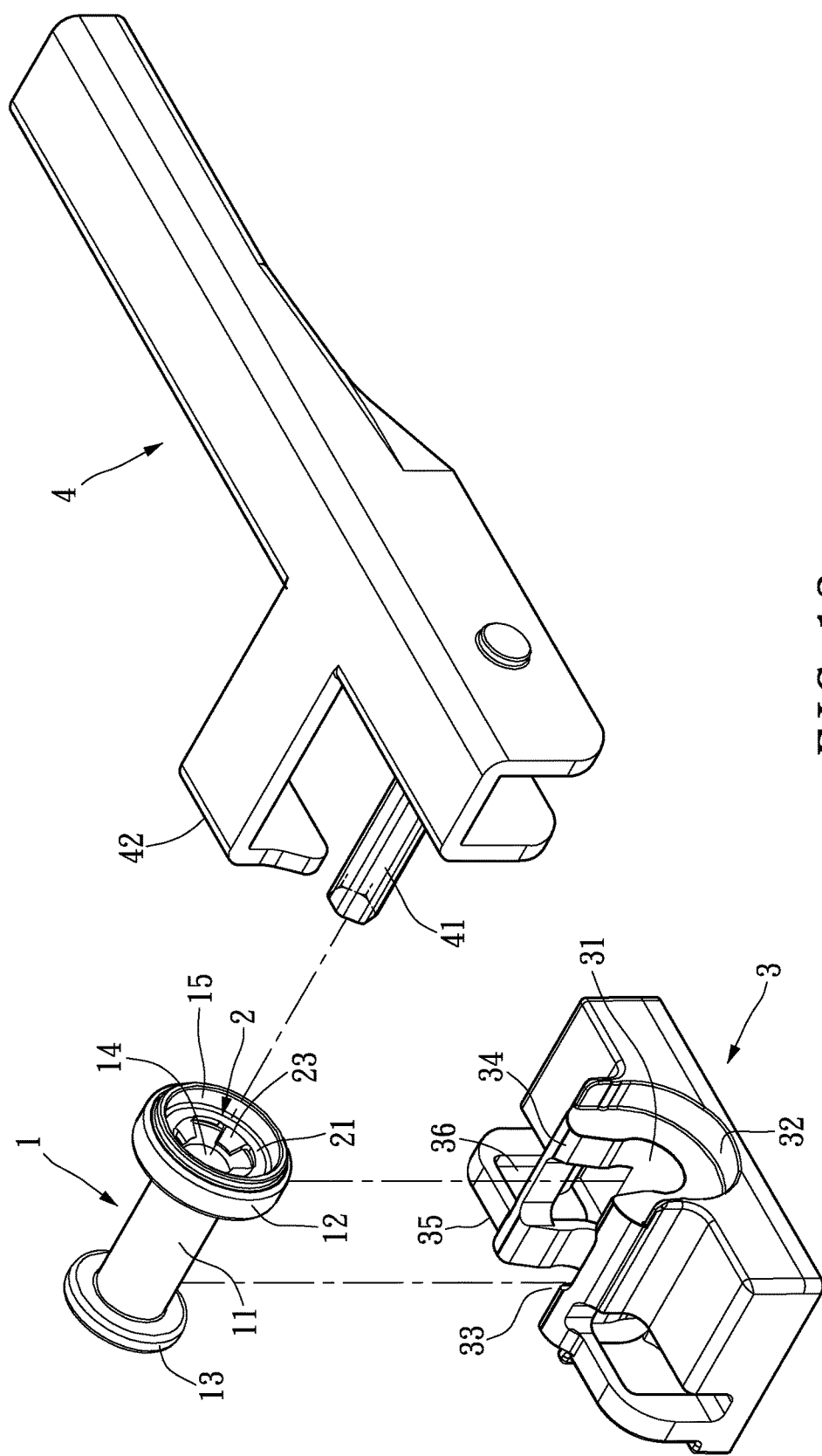
FIG. 13 shows a three-dimensional view of the wiper connector according to the fifth embodiment of the instant disclosure.
Figure 14:
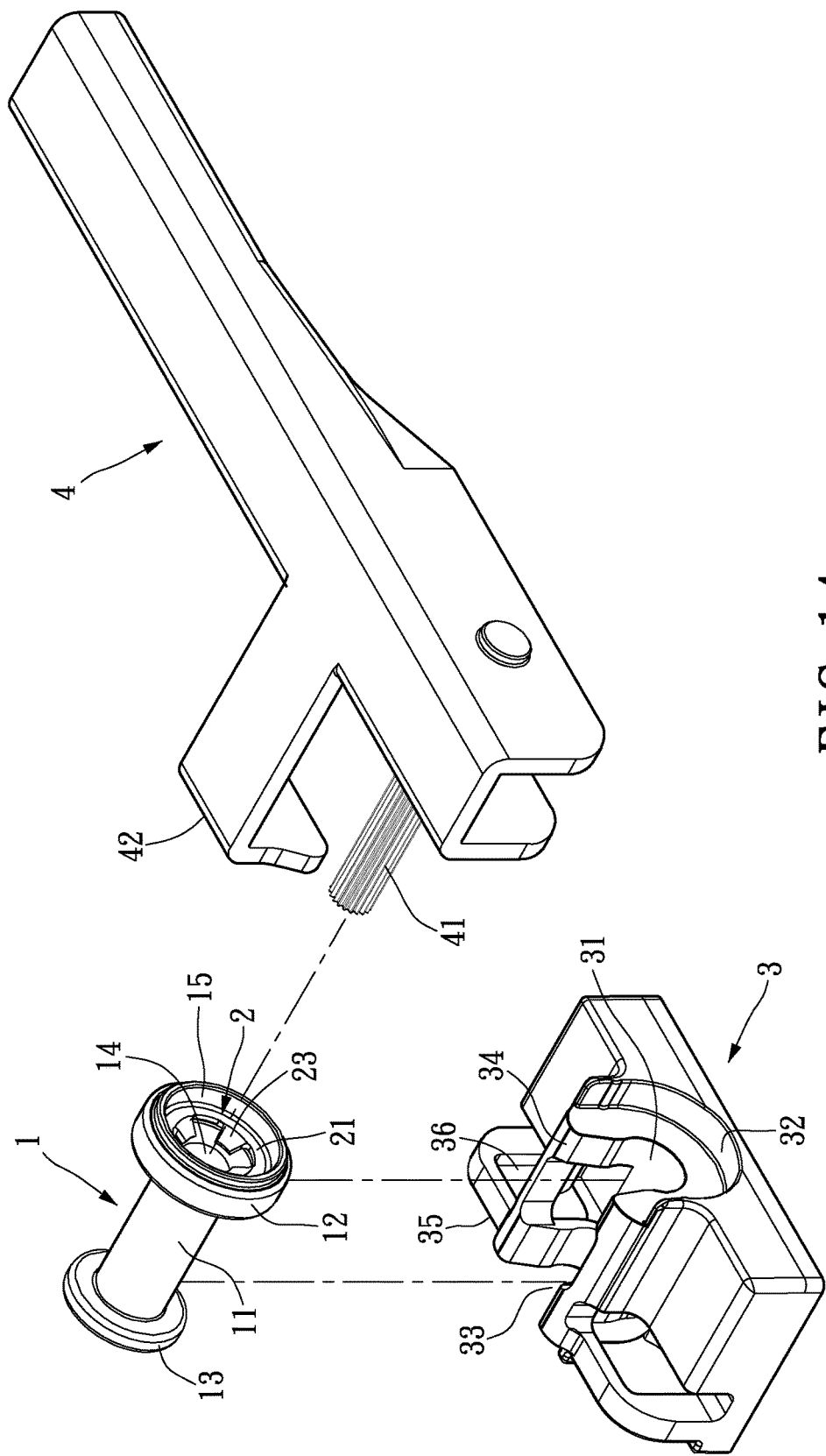
FIG. 14 shows a three-dimensional view of the wiper connector according to the sixth embodiment of the instant disclosure.
Figure 15:
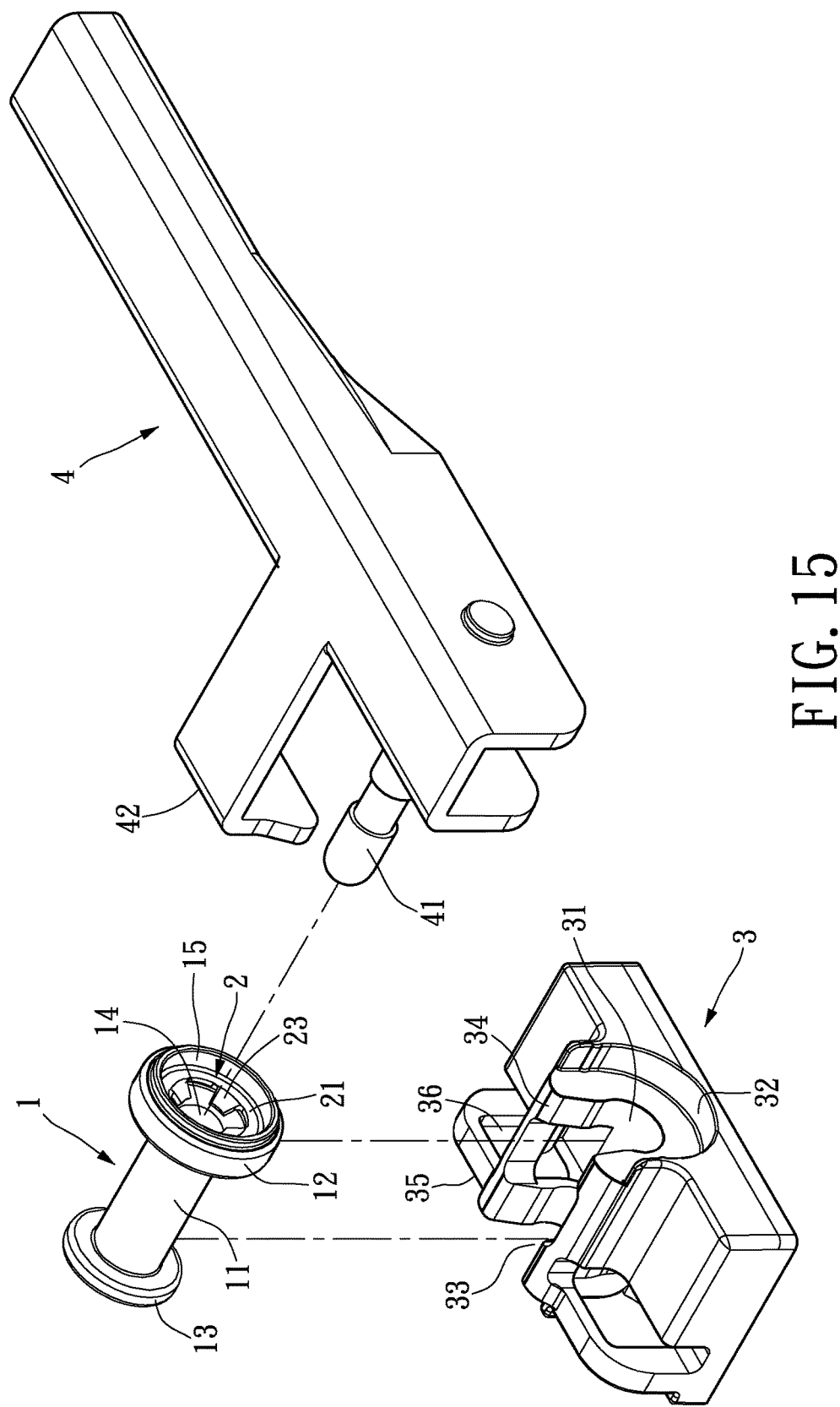
FIG. 15 shows a three-dimensional view of the wiper connector according to the seventh embodiment of the instant disclosure.

Please refer to FIGS. 8 and 9. The wiper arm 4 will be substantially parallel to the base 3 after assembly with the sleeve adaptor. Specifically speaking, the wiper arm 4 will be above the base 3 to form an angle ≥0 therebetween. The wiper arm 4 is then depressed in the vertical direction for the first flange 12 and the second flange 13 to receive respectively within the first restricting trough 32 and the second restricting trough 33 of the base 3, while the tube body 11 is received in the corresponding clutching trough 31. Therefore, the tube body 11 is tightly engaged to the clutching trough 31 to be nicely assembled. After the assembly of the wiper arm 4, the sleeve tube 1 and the base 3, the inner portion of the wiper arm 4, away from the base portion of the bolt 41, will not interfere with the base 3.

Basically, according to the wiper arm 4 shown in FIG. 1, the bolt 41 does not possess fastening ability; the fastening ability (or the locking ability) thereof is achieved through the mechanical interference provided by the shoulder portion 42. Therefore, during the operation of the wiper, there will be two forces acting on two different planes, where these two forces may cross-interfere, thus creating instability. Aside from the bolt-protecting function, the sleeve adaptor of the instant disclosure may convert the multiple forces from the wiper arm 4 into one. Therefore, improving the functional stability of the wiper during operation even in cases where the shoulder portion 42 of the wiper arm 4 is not in the locking condition.

Embodiments Two to Seven

Please refer to FIGS. 10 to 15, the instant disclosure can be applied on different types of bolt-type wiper arms and is not restricted only to the wiper arm mentioned in the first embodiment. The bolt 41 of the bolt-type wiper arm can be selected from the group consisting of a cylinder (shown in FIG. 10), a triangular prism (shown in FIG. 11), a tetragonal prism (shown in FIG. 12), a hexagonal prism (shown in FIG. 13), a polygonal prism (shown in FIG. 14), and an irregular-shaped prism (shown in FIG. 15) or even prisms in other shapes, where any type of wiper arm which has bolt is suitable for the wiper connector and the sleeve adaptor of the instant disclosure.

The wiper connector and the sleeve adaptor of the instant disclosure has the following advantages:

1. The wiper connector and the sleeve adaptor of the instant disclosure cannot be easily dismantled after they are assembled together, and thereby forming a firm, sleeve adaptor which cannot be easily dismantled except by force. Therefore, the bolt can be well protected and the functional stability of the wiper during operation can be well maintained.

2. The wiper arm with the assembled sleeve tube can be assembled to the base directly from the top, where this assembly method is different from the methods of the prior art.

3. The wiper connector and the sleeve adaptor of the instant disclosure have simple structures and can be easily assembled, and thereby, providing advantages such as easy utilization and a lower cost.

4. The base of the instant disclosure can further include a anti-mismating portion to provide the anti-mismating function, and thereby reducing the possibility of damaging due to mismating.

5. The instant disclosure is widely applicable which can be applied on different bolt-type wiper arms, therefore, there is no need to select specific wiper assemblies having bolts in different forms in order to be connectable.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A wiper connector for adapting wiper blades onto a wiper arm having a bolt, wherein the wiper arm has a shoulder portion, comprising:
    a sleeve tube having a tube body, a first flange, and a second flange respectively extending from two ends of the tube body, wherein the sleeve tube has a pivoting hole defined therein, wherein one end of the pivoting hole forms an opening that is accommodatable for the bolt of the wiper arm, wherein the first flange defines a receiving compartment;
    a fastening member having a circular ring body and a plurality of flexible abutting portions, wherein the circular ring body is a continuous ring-shaped structure without gaps; wherein the fastening member is fixed in the receiving compartment of the first flange, and the plurality of flexible abutting portions are formed protrudingly from an inner fringe of the circular ring body of the fastening member, and the plurality of flexible abutting portions are inclined toward the pivoting hole, wherein the bolt is inserted into the pivoting hole via the fastening member via the pivoting hole,
    wherein the plurality of flexible abutting portions each has such a size and an inclined angle toward the pivoting hole and toward the second flange so that the bolt is unidirectionally and slidably inserted into the pivoting hole via the fastening member from the first flange of the sleeve tube, the bolt contacts the flexible abutting portions and pushes the flexible abutting portions to incline toward the pivoting hole, thus the bolt is tightly engaged by the plurality of flexible abutting portions and the bolt is unable to be extracted out of the pivoting hole, and a circumferential portion of the bolt is tightly engaged by the plurality of flexible abutting portions; and
    a base having a clutching trough, a first restricting trough, and a second restricting trough connected to two ends of the clutching trough; wherein the base is fixed to the wiper blade; wherein the first and the second flanges of the sleeve tube are respectively receivable in the first and the second restricting troughs; wherein the tube body of the sleeve tube is receivable and engaged tightly within the clutching trough; wherein the fastening member is separable from the sleeve tube; wherein each of the first and second restricting troughs is an arced trough having an opening on a top portion thereof;
    wherein the first flange has a diameter larger than a diameter of the second flange, wherein the first restricting trough has a width larger than a width of the second restricting trough.

2. The wiper connector according to claim 1, wherein outer diameters of the first and the second flanges are greater than an outer diameter of the tube body, and wherein outer diameters of the first and the second flanges are different.

3. The wiper connector according to claim 1, wherein the pivoting hole is substantially a circular hole, wherein the pivoting hole has a first end closed to the first flange and a second end closed to the second flange; the second end of the pivoting hole is either a closed or opened hole; wherein an inner diameter of the second end is smaller than a diameter of the bolt when the second end is opened hole.

4. The wiper connector according to claim 1, wherein the plurality of flexible abutting portions extends in a slant manner towards an inserting direction of the bolt.

5. The wiper connector according to claim 1, wherein a circumferential portion of the circular ring body has an interfering portion formed thereon, wherein the interfering portion is mounted to inner walls of the receiving compartment.

6. The wiper connector according to claim 1, wherein a distance between an inner fringe and an outer fringe of the fastening member is smaller than 5 mm.

7. The wiper connector according to claim 1, wherein the bolt is selected from the group consisting of a cylinder, a triangular prism, a tetragonal prism, a hexagonal prism, a polygonal prism, and an irregular-shaped prism.

8. The wiper connector according to claim 1, wherein the base has at least one accommodating slot formed thereon, wherein the at least one accommodating slot is adjacent to the second restricting trough to accommodate the shoulder portion of the wiper arm, so as to avoid a structural interference between the wiper arm and the base.

9. The wiper connector according to claim 1, wherein the base has an anti-mismating portion, wherein the anti-mismating portion includes two protrusions protrudingly formed on the base, and the two protrusions are formed on two sides of the clutching trough.

10. The wiper connector according to claim 9, wherein a distance between the two protrusions is smaller than outer diameters of the first and the second flanges, and a width of the shoulder portion of the wiper arm.

11. The wiper connector according to claim 10, wherein a distance from any edge of the anti-mismating portion to a center point of the sleeve tube is greater than or equal to a distance from a center of the bolt to the shoulder portion.

12. The wiper connector according to claim 10, wherein a width of the anti-mismating portion is greater than or equal to a distance from an edge of the bolt to an inner fringe of the shoulder portion.

13. The wiper connector according to claim 1, wherein the bolt is a column-shaped body having a first end surface and a second end surface, the first end surface is adjacent to the wiper arm, the second end surface is away from the wiper arm, the flexible abutting portions are inclined toward the second end surface of the bolt.

* * * * *